United States Patent [19]
Parsadayan et al.

[11] Patent Number: 5,854,831
[45] Date of Patent: Dec. 29, 1998

[54] ACCESS CONTROL APPARATUS FOR USE WITH BUILDINGS, GATED PROPERTIES AND THE LIKE

[75] Inventors: Alex Parsadayan; Walter Parsadayan, both of Laguna Niguel, Calif.

[73] Assignee: Elite Entry Phone Corporation, Lake Forest, Calif.

[21] Appl. No.: 681,615

[22] Filed: Jul. 29, 1996

[51] Int. Cl.[6] .................................................. H04M 11/00
[52] U.S. Cl. ...................................................... 379/102.06
[58] Field of Search ........................... 379/102.06, 90.01, 379/110.01, 330; 340/825.31; 70/63

[56]   References Cited

U.S. PATENT DOCUMENTS

| | | |
|---|---|---|
| 3,816,662 | 6/1974 | Shaver et al. . |
| 3,917,911 | 11/1975 | Lesher . |
| 4,113,986 | 9/1978 | Clement et al. . |
| 4,465,904 | 8/1984 | Gottsegen et al. . |
| 4,503,291 | 3/1985 | von Holten et al. . |
| 4,658,095 | 4/1987 | Santiago . |
| 4,720,849 | 1/1988 | Tayama . |
| 4,727,934 | 3/1988 | Eckel et al. . |
| 4,885,771 | 12/1989 | Rabideau et al. . |
| 4,937,855 | 6/1990 | McNab et al. . |
| 5,027,111 | 6/1991 | Davis et al. . |
| 5,303,300 | 4/1994 | Eckstein . |
| 5,416,495 | 5/1995 | Davis et al. . |

FOREIGN PATENT DOCUMENTS

| | | |
|---|---|---|
| 245 709 A1 | 4/1987 | European Pat. Off. . |
| 2 658 020 A1 | 8/1991 | France . |

OTHER PUBLICATIONS

Sentex Systems, Inc. Advertisement for Telephone Entry System with Built–in LCD Electronic Directory, p. 71 from Alarm Installer & Dealer ("AID"), Sep. 1988.

Santhanam, A.T. et al., "Cemented Carbides", pp. 950–977.

Matsumoto, S. et al., "Vapor Deposition of Diamond Particles from Methane", Japanese Journal of Applied Physics, vol. 21, No. 4, Apr. 1982, pp. L183–L185.

*Primary Examiner*—Stella Woo
*Attorney, Agent, or Firm*—Oppenheimer Wolff & Donnelly LLP

[57]   ABSTRACT

An access control apparatus with an outer housing including a door and a plurality of outer keys, a substantially closed inner housing that is removably mounted within the outer housing, and an electronic communication device within the inner housing which is operably connected to a telephone system and to the outer keys.

29 Claims, 6 Drawing Sheets

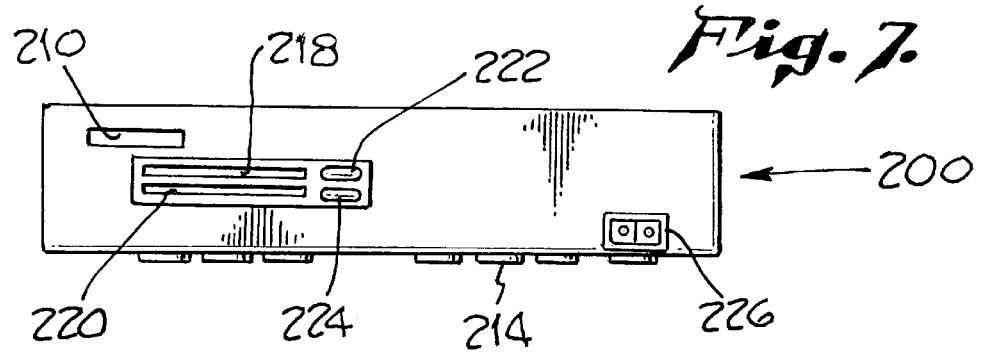
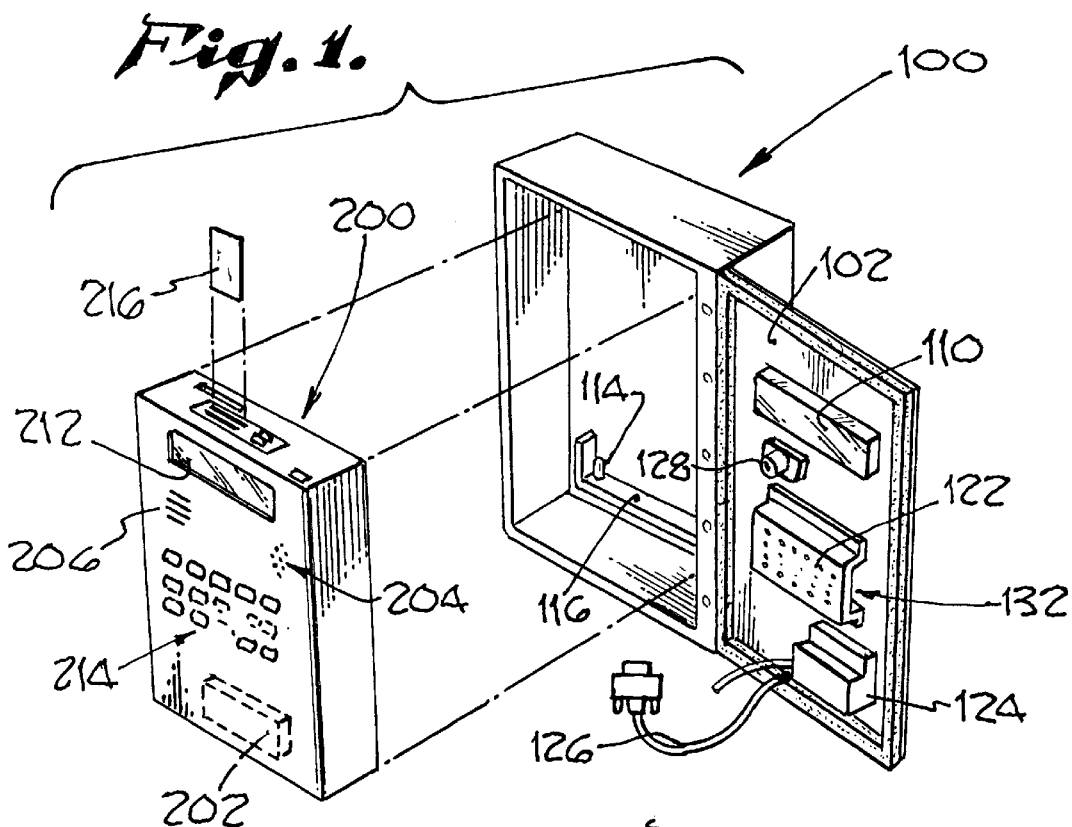
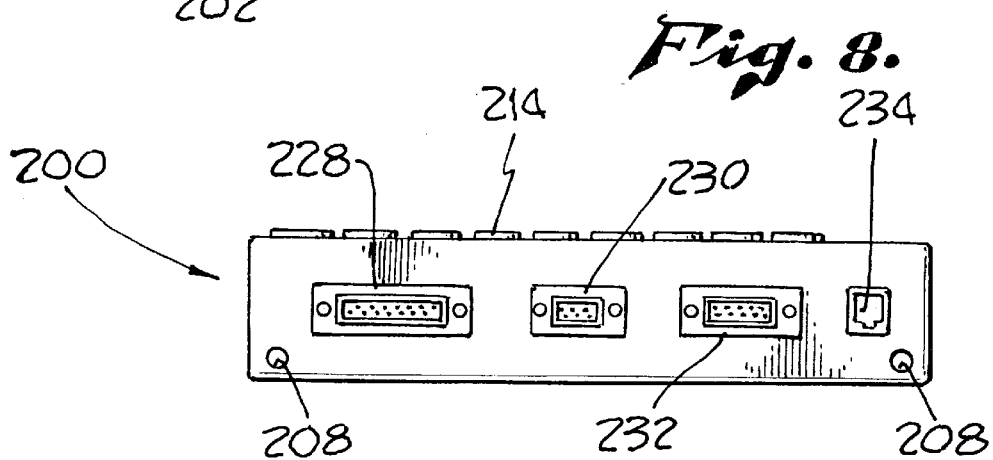

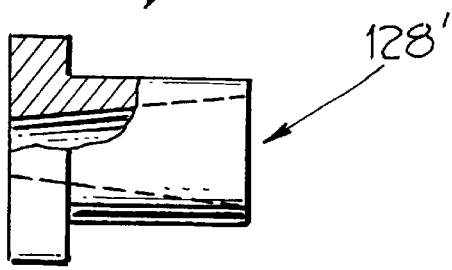
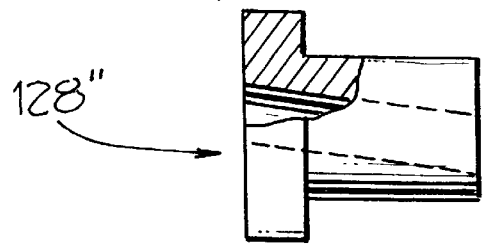
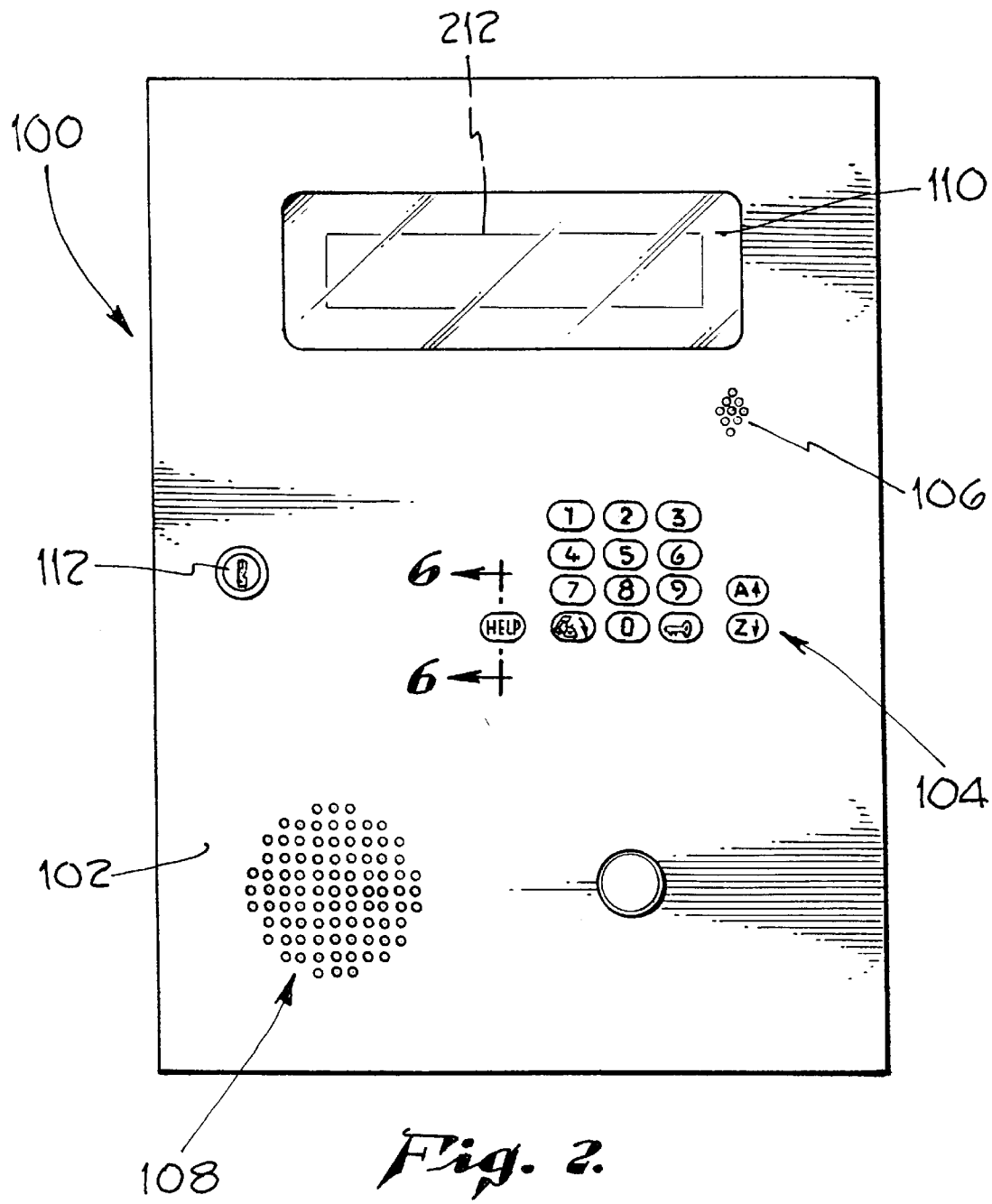
Fig. 2.

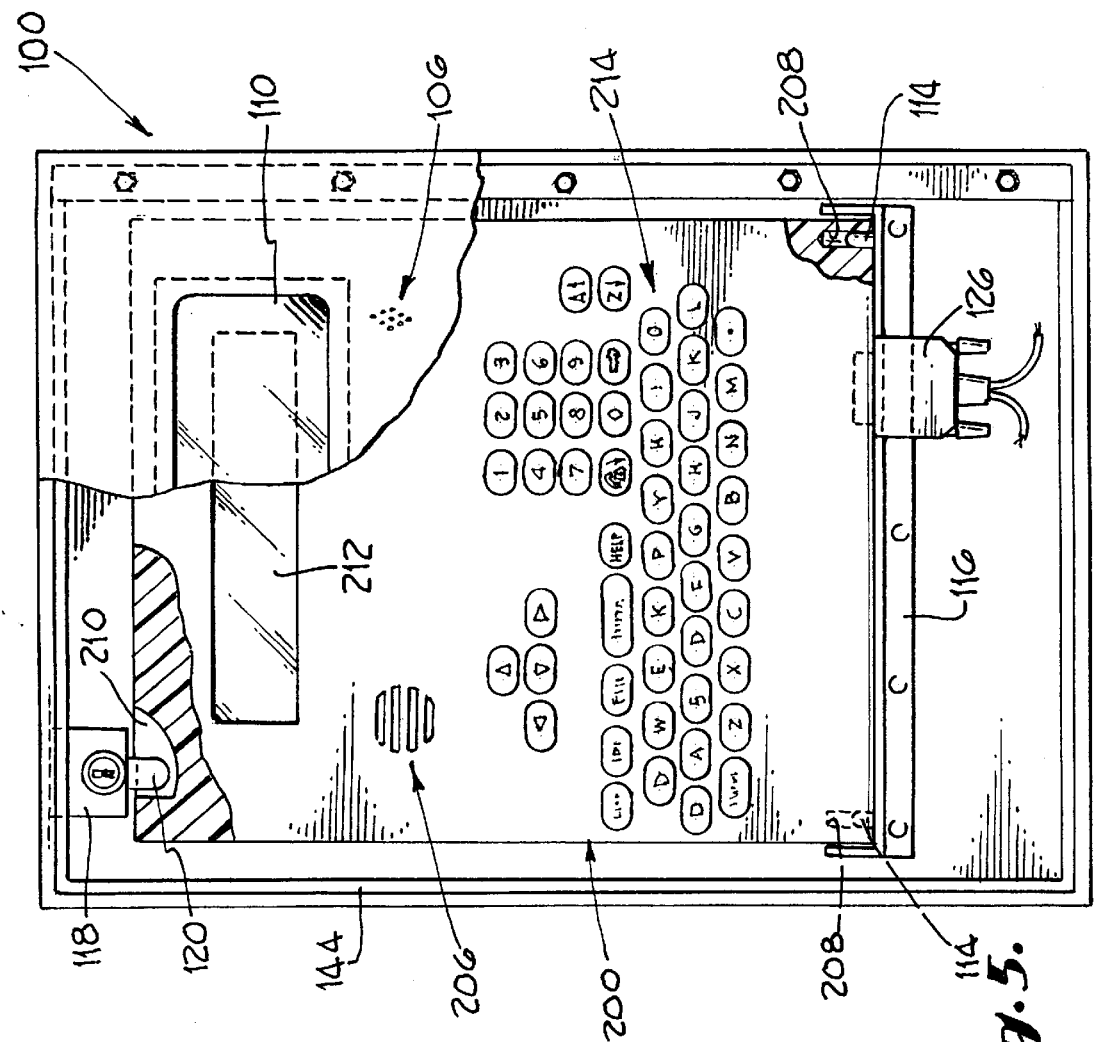
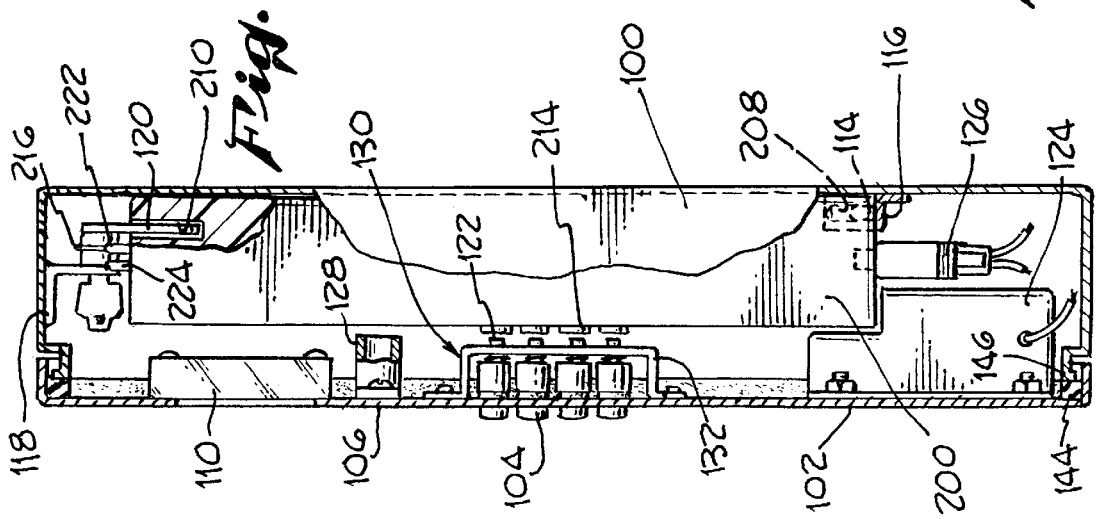

ACCESS CONTROL APPARATUS FOR USE WITH BUILDINGS, GATED PROPERTIES AND THE LIKE

BACKGROUND OF THE INVENTION

1. Field of Invention

The present invention relates generally to access control apparatus and, more particularly, to access control apparatus which are connected to remote locations by a telephone system.

2. Description of the Related Art

Apartment buildings, office buildings, condominium complexes, gated residential communities, industrial parks and other secured locations often include a locked entrance and a security system for establishing communication between visitors who wish to enter the secured location and persons who are capable of unlocking the entrance from a remote location. One type of security system uses existing telephone systems to establish such communication. In such a system, an access control apparatus, or call box, is provided at the entrance. The call box, which includes a keypad and an auto-dialer, is connected to a telephone line and to the entrance lock. A numbered directory of persons, businesses or other parties capable of unlocking the entrance is provided by the call box itself or on a sign located adjacent to the call box. When the visitor enters a code number into the call box keypad, the call box automatically dials the telephone number corresponding to the code number. Once the identity of the person who wishes to gain access is established, the called party can unlock the entrance by pressing a predetermined number into the keypad of the called telephone.

Prior access control apparatus, such as that disclosed in U.S. Pat. No. 5,027,111 to Davis et al., consist of a rigid metallic case having various electronic elements permanently housed therein. Access to the interior of the case is provided by a door. The electronic elements typically consist of a printed circuit board that includes a microprocessor, an EEPROM-type permanent memory, a volatile memory, a modem and a bus. Various input and output ports are also provided. These ports allow the electronic elements to be connected to telephone lines, computers, keyboards and handheld programmers. Necessary data, such as code numbers, telephone numbers and names, may be entered into the permanent memory from a remote location via the telephone line and modem, or locally through the use of a computer keyboard or handheld programmer that is plugged into one of the ports. The exterior of the box includes the aforementioned keypad as well as a speaker and a microphone. The speaker and microphone may be provided in the form of a telephone handset or mounted directly onto the metallic box. The keypad, microphone and speaker are connected to the printed circuit board by ribbon cables and other wiring.

Although generally useful for regulating entry into a secured location, there are a number of disadvantages associated with existing access control apparatus. The primary disadvantage is associated with programming the electronic elements and entering information into the permanent memory. Programming and data entry via a modem has proven to be quite complicated. In addition, existing modem based systems are difficult to use. The use of keyboards and handheld programmers is also problematic because the technician must stand next to the access control apparatus while entering data. As the vast majority of these units are located outdoors, technicians are often subjected to the extreme heat in the summer and cold in the winter. Rain and snow present additional difficulties. It is also uncomfortable for the technician to stand next to the unit being serviced, hold a keyboard or handheld programmer with one hand, and type with the other.

Other shortcomings are associated with repair and maintenance. The metallic cases are often damaged or destroyed by vandals and thieves. In addition to being susceptible to this type of damage, the electronic elements are also prone to damage from extreme temperatures and power surges. The microphones are often damaged by moisture from rain or fog. The visual displays which are provided on the exterior of some existing call boxes are also easy targets for vandals. Existing keypads, which typically consist of a key and membrane switch arrangement that is mounted on the door of the metallic case, are also easily damaged when struck with a heavy object such as a baseball bat. Repairing a prior access control apparatus is a very expensive proposition. Because the speaker, microphone and printed circuit board containing the electronic elements are permanently mounted within the metallic case, it is difficult to remove them for repair or for substitution into a new case when the existing case is damaged. Also, if the memory fails, all of the data concerning names, code numbers, and telephone numbers will have to be re-entered, usually by hand by a technician forced to stand next to the unit.

Accordingly, a need exists for an access control apparatus that is easier to maintain, less susceptible to damage, and easier to repair than existing apparatus.

OBJECT AND SUMMARY OF THE INVENTION

A general object of the present invention is to provide an access control apparatus that is superior to those presently known in the art. In particular, one object of the present invention is to provide an access control apparatus that is easier and less expensive to service than existing apparatus. Another object of the present invention is to provide an access control apparatus which is less susceptible to damage than existing apparatus. Still another object of the present invention is to provide an access control apparatus which is easier to repair than existing apparatus.

These and other objectives are accomplished by providing an access control apparatus comprising an outer housing including a door and a plurality of outer keys, a substantially closed inner housing that is removably mounted within the outer housing, and an electronic communication device within the inner housing which is operably connected to the telephone system and to the outer keys. This novel configuration is far easier to service than existing apparatus. Should the electronic communication device require service, reprogramming or data entry, the inner housing may be easily removed and, if so desired, replaced on the spot by a similar unit. Once removed, the requisite service may be easily performed. If serviced locally, the inner housing may be taken into the associated building or to the technician's vehicle where the technician may comfortably sit and perform the requisite service.

In accordance one embodiment of the present invention, the inner housing is provided with a non-volatile memory module and a memory module port adapted to receive the memory module. The memory module may be used to store data such as code numbers, telephone numbers, names and settings that are dictated by the time of the day and day of the week. If the inner housing needs to be removed for service or replacement, the memory module may be placed into the replacement inner housing. As a result, the arduous task of entering the data and settings into a replacement unit is eliminated. In addition, data stored in the non-volatile memory module will not be lost in the event of a prolonged power failure.

In accordance with another embodiment of the present invention, a microphone is associated with the inner housing and the outer housing includes at least one microphone aperture that is aligned with the microphone. A hollow conduit connecting the microphone and aperture may also be provided. This novel configuration substantially prevents the moisture (i.e. rain or fog) caused microphone damage associated with prior apparatus which, as noted above, include a microphone mounted directly onto the metallic case. The inner housing may also include a speaker which is useful whether or not a particular unit is in use. When the unit is mounted within an outer housing, the speaker will provide audible sound that is transmitted through apertures in the outer housing. Alternatively, the outer housing will be provided with its own speaker which is connected to the inner housing and which performs the speaker function for the overall system. The speaker associated with the inner housing is also useful when an inner housing is being serviced. The speaker allows the technician to make calls and perform other tests to insure that the unit is working correctly.

In accordance with still another embodiment of the present invention, the inner housing includes a visual display and a plurality of keys which respectively correspond to the letters A–Z and to the numbers 0–9. A plurality of function keys may also be provided. So configured, data may be entered directly into the inner housing by the technician. The need for separate keyboards, handheld programmers and modems associated with prior access control apparatus is, therefore, eliminated.

Many other features and attendant advantages of the present invention will become apparent as the invention becomes better understood by reference to the following detailed description considered in conjunction with the accompanying drawings.

BRIEF DESCRIPTION OF THE DRAWINGS

Detailed description of the preferred embodiment of the invention will be made with reference to the accompanying drawings.

FIG. 1 is an exploded view in accordance with a preferred embodiment of the present invention.

FIG. 2 is a front elevation view of the preferred embodiment shown in FIG. 1.

FIG. 4 is a section view taken along line 4—4 in FIG. 3.

FIG. 5 is a front elevation and partial section view of the interior of the preferred embodiment shown in FIG. 1.

FIG. 7 is a top view of an exemplary inner housing.

FIG. 8 is a bottom view of an exemplary inner housing.

FIGS. 10a and 10b are side views of microphone conduits in accordance with one aspect of the present invention.

DETAILED DESCRIPTION OF THE PREFERRED EMBODIMENTS

Figure 6:
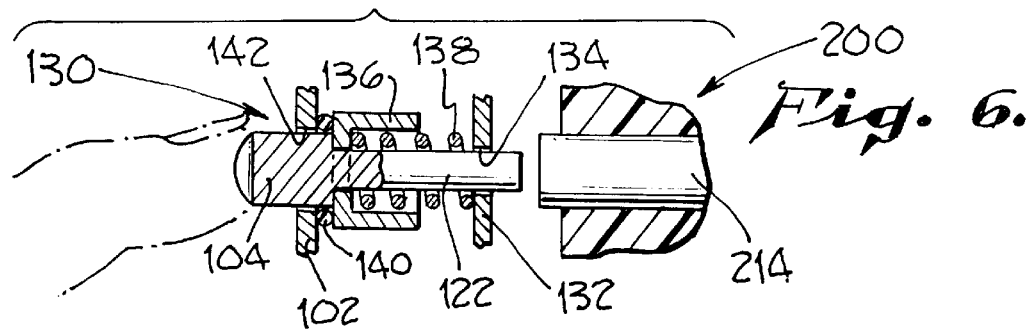
FIG. 6 is a section view taken along line 6—6 in FIG. 2.

The following is a detailed description of the best presently known mode of carrying out the invention. This description is not to be taken in a limiting sense, but is made merely for the purpose of illustrating the general principles of the invention. The scope of the invention is defined solely by the appended claims.

As illustrated in FIG. 1, one example of the present access control apparatus includes an outer housing 100 and an inner housing 200 which may be removably mounted within the outer housing. Within the inner housing 200 is an electronic communication device 202 (shown in FIGS. 9a and 9b and discussed in detail below) that may be connected to a telephone system. In accordance with the exemplary embodiment, the inner housing 200 may also include a microphone 204 and a speaker 206.

The front panel 102 of the exemplary outer housing 100 is shown in FIG. 2. The front panel 102 includes a plurality of depressible outer keys 104, microphone apertures 106 and speaker apertures 108. A window 110 for providing visual access to the inner housing 200 may also be provided. In those instances where the front panel 102 also serves as a door, as in the exemplary embodiment, a lock 112 may be mounted thereon. For durability and appearance, the front panel 102 is preferably 16 gauge stainless steel. The remaining portion of the outer housing 100 may be formed from the same material or from gold/zinc plated, powder coated 16 gauge metal.

Figure 3:
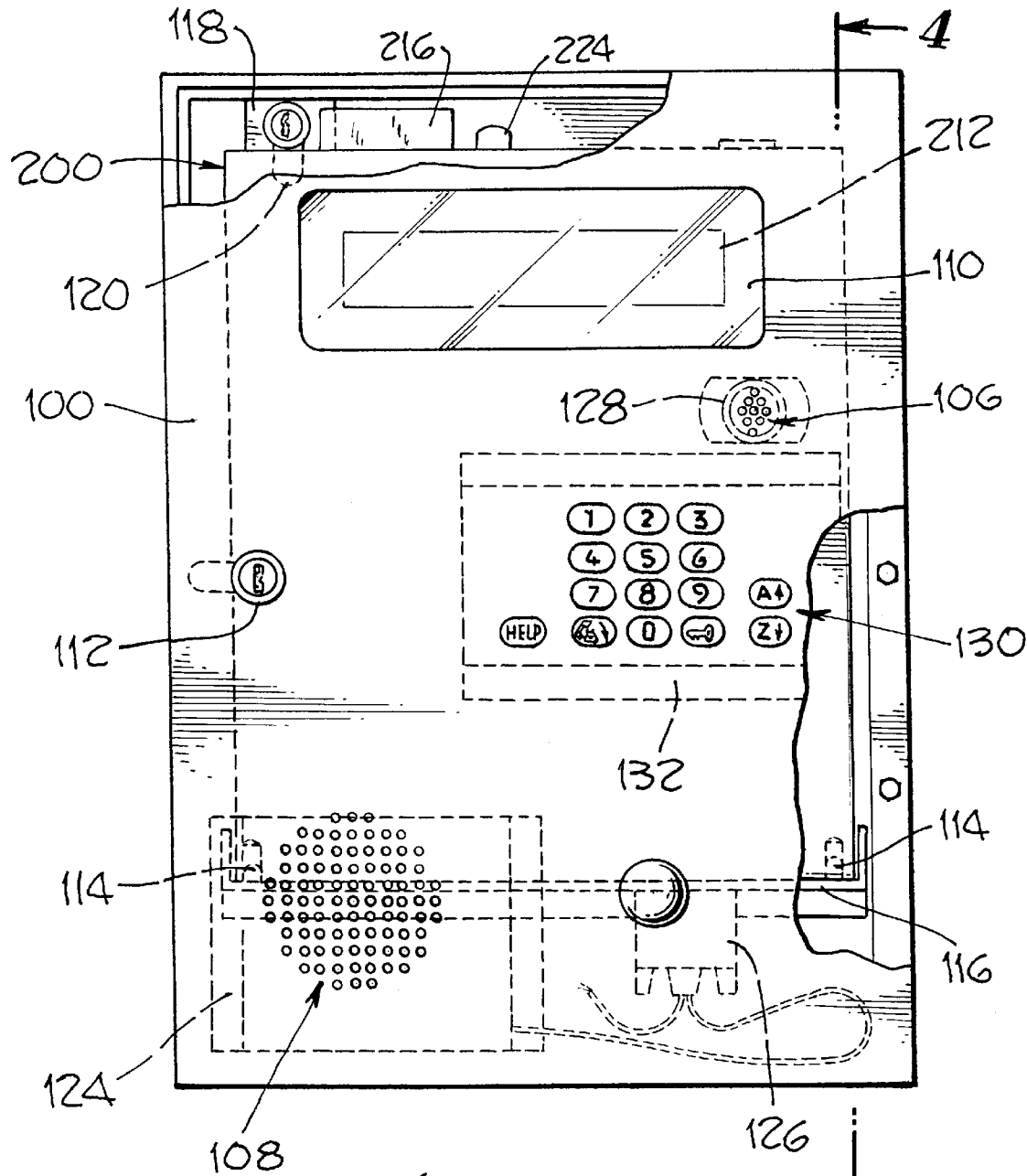
FIG. 3 is a partial section and front elevation view of the preferred embodiment shown in FIG. 1.

As shown by way of example in FIGS. 3–5, the outer housing 100 includes mounting pins 114 that are received by mounting apertures 208 in the inner housing 200. The mounting pins 114 may be mounted on a shelf 116 which vertically supports the inner housing 200. A locking device 118, which includes a pivotable locking tab 120, cooperates with a locking recess 210 that is formed in the inner housing. After the inner housing mounting apertures 208 have been placed over the mounting pins 114, the locking tab 120 may be pivoted to the locked orientation shown in FIGS. 3–5. One the inner housing 100 is in place and the outer housing 200 is closed, a gasket 144 and abutment 146 seal the outer housing and prevent moisture from entering the outer housing.

A visual display 212, which may be provided on the inner housing 200, is aligned with the window 110. The visual display 212 is preferably a multi-line LCD display that is backlit for evening use. However, displays such as vacuum fluorescent displays, plasma displays, light emitting diode displays and cathode ray tube displays may also be used. The window 110 is preferably a thick (approximately ¾ of an inch) protective lens. Suitable lens materials include materials which are capable of withstanding significant blows such as acrylic.

The inner housing 200 may also include a plurality of inner keys 214 which correspond to the numbers 0–9 and the letters A–Z. Additional keys, such as scroll keys and space keys, can also be provided for other functions. The inner and outer keys are respectively arranged such that, at a minimum, the like numbered inner keys are aligned with the like numbered outer keys. Other function keys may also be aligned. The outer keys 104 each include a longitudinally extending element 122 which will actuate a corresponding inner key 214 when an outer key is depressed. A speaker 124, which may be connected to the inner housing 200, is provided within the exemplary outer housing 100. The speaker 124 is connected to the inner housing 200 by a connector 126.

The outer housing 100 may also include a hollow conduit 128 which extends from microphone apertures 106 to the microphone 204. The conduit 128 improves the transmission of sound from the exterior of the outer housing 100 to the microphone 204 on the inner housing 200. In addition, as shown in FIGS. 10a and 10b, the inner surface of the conduit 128 may be slanted toward the exterior of the housing so that moisture within the conduit will be driven by gravity toward the exterior of the housing and away from the microphone. For example, the inner surface of conduit 128' is in the form of a cone (FIG. 10a) and the inner surface of conduit 128" is in the form of a slanted cylinder (FIG. 10b).

In order to prevent damage to the inner keys 214 and to the inner housing 200 itself which could be caused when an excessive force is applied to the outer keys 104, the exemplary outer housing 100 further includes a blocking arrangement 130. Referring to FIGS. 4 and 6, the blocking arrangement 130 includes a bracket 132 having a series of apertures 134 that respectively allow passage of the longitudinally extending elements 122. A radially extending element 136, the diameter of which is too large to pass through the corresponding aperture 134, is secured to each of the longitudinally extending elements 122. As an outer key 104 is depressed, the radially extending element 136 will strike the bracket 132 and prevent the longitudinally extending element 122 from moving beyond a predetermined point. The predetermined point corresponds to the location necessary to actuate the corresponding inner key 214. Springs 138 are used to outwardly bias the outer keys 104 and an o-ring type seal 140 may be used to prevent dirt, moisture and other contaminants from entering the interior of the outer housing 100 through the space between the keys 104 and key apertures 142.

Referring now to FIGS. 1, 7 and 8, the inner housing 200 may be provided with one or more non-volatile RAM memory modules 216, such as PCMCIA memory cards. The memory modules 216 may be used to store data such as code numbers, names, telephone numbers, and settings that are dictated by the time of day and day of the week. One end of the inner housing 200 includes a pair of memory module ports 218 and 220 which are adapted to receive the memory modules. The ports 218 and 220 are connected to the communication device 202 and include eject buttons 222 and 224. A power on/off 226 switch is also provided on the inner housing. The other end of the exemplary inner housing 200 includes a parallel printer port 228, an additional port 230 which may be used to connect the inner housing to a card reader, radio receiver or other device, a connector 232 which receives the connector 126 associated with the speaker 124, and a telephone line jack 234.

In accordance with the illustrated embodiment, the interior of the inner housing 200 is not readily accessible because the electronic devices housed therein will not normally be repaired by field technicians. As noted above, the inner housing 200 is normally replaced by the field technician with a like unit if it has sustained damage. Thus, the inner housing 200 may be closed with screws or other semi-permanent mechanical fasteners.

Figure 9A:
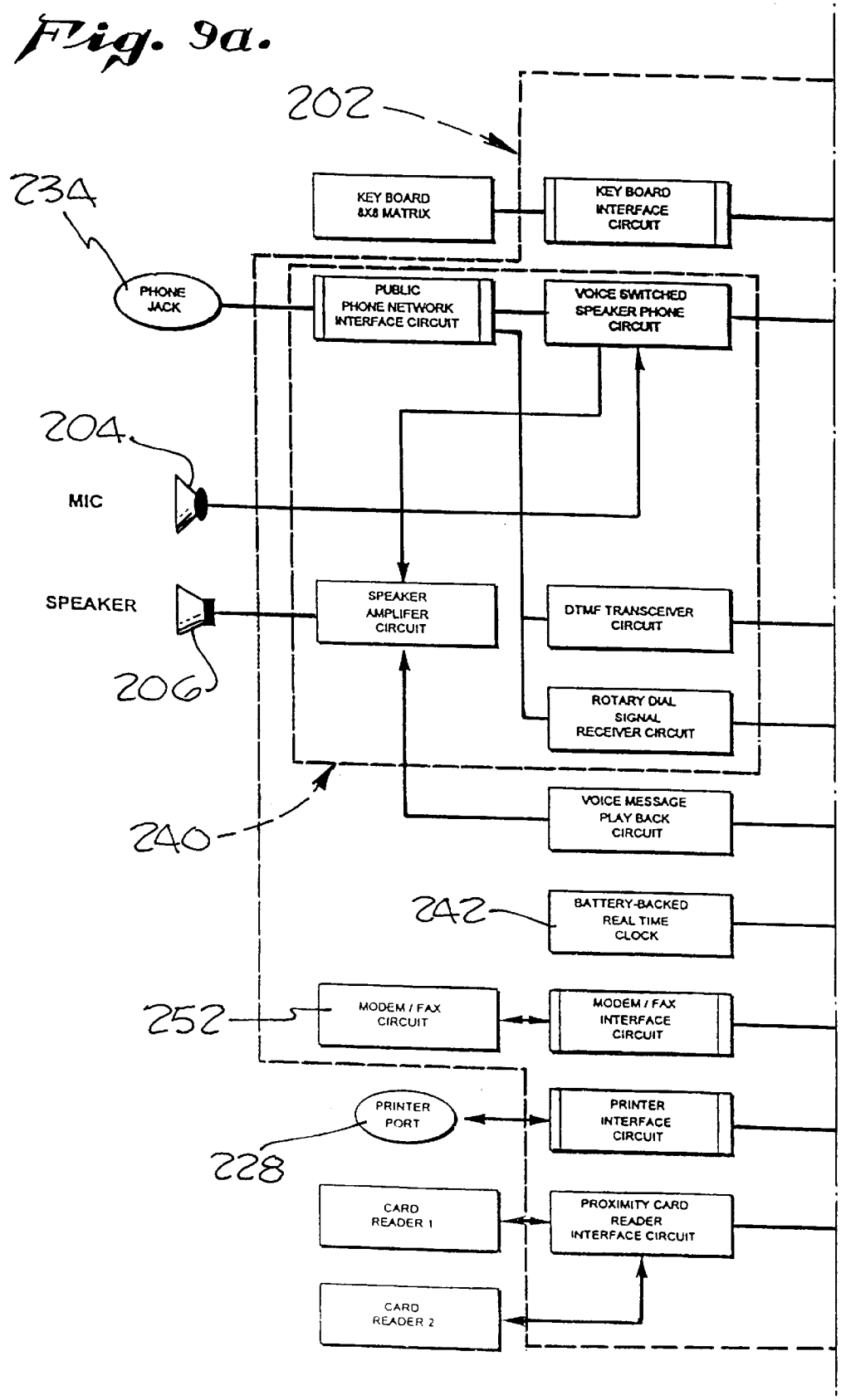
FIGS. 9a and 9b are schematic view of an exemplary communication device.
Figure 9B:
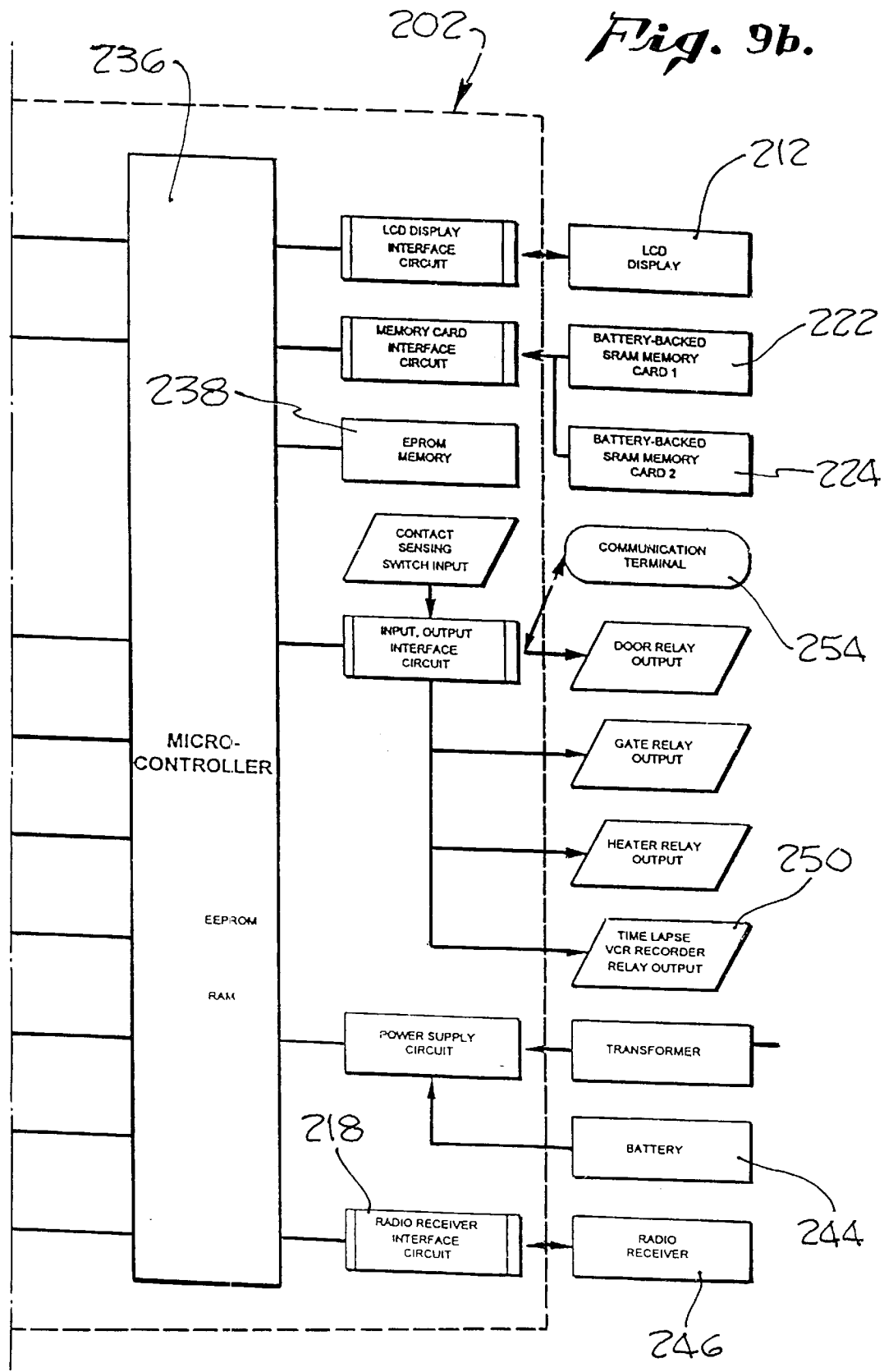

As illustrated for example in FIGS. 9a and 9b, the communication device 202 includes a microcontroller 236 (although other suitable devices such as a microprocessor may also be used) as well as a EPROM memory 238, telephone circuitry 240, a non-volatile real time clock/calendar 242, and an eight (8) hour back-up battery 244 are also provided. The connection of the communication device 202 to other aspects of the exemplary inner housing 200 is also shown. In addition, should radio contact with the access control apparatus be desired, a radio receiver 246 and the associated circuitry 248 may also be provided. In order to produce a record of all persons who use the access control apparatus, a video camera (and recorder) may be appropriately positioned nearby and the microprocessor 236 may be programmed so as to produce a "video record" signal for a predetermined period each time the keys 104 are touched. [Note VCR output 250.]

A modem interface/facsimile circuit 252 may also be provided which allows the present access control apparatus to transmit information regarding the status of various hardware settings such as, for example, volume settings and contrast settings. Through the use of so-called digital potentiometers, these hardware settings may then be adjusted from a remote location. Such adjustment may be accomplished by transmitting specific DTMF codes with a touch-tone phone or by modem-to-modem communication with a personal computer or with another access control apparatus. The exemplary embodiment also includes a communication terminal 254, such as a RS45, RS232 or other current loop communication device, that may be used to communicate with remote devices such as gate operators. Data and command sequences may be transferred between the access control apparatus and one or more gate operators. As such, the access control apparatus may be used to determine the current status of the gate operators and their various accessories and then fax or modem this information to a service center. Similarly, a service center may modem or fax the access control apparatus to request a report or to reprogram or control the gate operators.

Another advantageous feature of the present invention is a "panic alarm" which allows the control apparatus to be used to call the security company associated with the location. More specifically, either single multi-digit panic code for use by all persons associated with the location or individual panic codes for each person or tenant may be assigned. When the panic code is input into the keypad, the control apparatus will call the security company and establish voice communication with the security company so that the situation may be assessed and handled in the appropriate manner. In those instances where a video camera is employed, video images may also be transmitted to the security company.

Although the present invention has been described in terms of the preferred embodiment above, numerous modifications and/or additions to the above-described preferred embodiments would be readily apparent to one skilled in the art. By way of example, but not limitation, the round speaker apertures 108 may be replaced with a plurality of louvers, i.e. horizontal slots having an overhanging ledges associated therewith. Such louvers are useful for directing sound. However, when louvers are used, a plate with small holes should be secured behind the louvers on the inside of the door. This will prevent vandals from damaging the speaker by sliding a thin object through the louvers. It is intended that the scope of the present invention extends to all such modifications and/or additions and that the scope of the present invention is limited solely by the claims set forth below.

What is claimed is:

1. An access control apparatus for use with a security system that is operably connected to a telephone system, the access control apparatus comprising:

an outer housing including a door and defining an interior and an exterior, the exterior of the outer housing including a plurality of outer keys arranged in predetermined locations;

a substantially closed inner housing, defining an interior and an exterior, removably mounted within the interior of the outer housing;

an electronic communication device within the interior of the inner housing and adapted to be operably connected to the telephone system and to the outer keys such that the electronic communication device can be operated with the outer keys when the outer housing door is closed;

a microphone operably connected to the communication device and associated with at least one of the outer housing and the inner housing; and a speaker operably connected to the communication device and associated with at least one of the outer housing and the inner housing.

2. An access control apparatus as claimed in claim 1, wherein the inner housing defines at least one mounting aperture and the interior of the outer housing includes at least one mounting pin adapted to be inserted into the mounting aperture.

3. An access control apparatus as claimed in claim 1, wherein the inner housing defines at least one locking aperture and the interior of the outer housing includes at least one locking device movable between a locking orientation substantially within the locking aperture and a release orientation in spaced relation to the locking aperture.

4. An access control apparatus as claimed in claim 1, wherein the outer housing includes at least one locking device adapted to releasably engage the inner housing and lock the inner housing within the interior of the outer housing.

5. An access control apparatus as claimed in claim 1, further comprising:

a visual display associated with at least one of the outer housing and the inner housing.

6. An access control apparatus as claimed in claim 5, wherein the visual display is associated with the exterior of the inner housing, the outer housing includes a window and the visual display is substantially aligned with the window when the inner housing is mounted within the interior of the outer housing.

7. An access control apparatus as claimed in claim 1, wherein inner housing includes telephone line port adapted to mechanically secure a telephone line to the inner housing such that the telephone line makes electrical connection with the communication device.

8. An access control apparatus as claimed in claim 1, wherein the communication device comprises a microprocessor.

9. An access control apparatus as claimed in claim 8, wherein the inner housing comprises at least one removable non-volatile memory module and at least one memory module port on the exterior of the inner housing adapted to receive the at least one non-volatile memory module and operably connect the at least one non-volatile memory module to the microprocessor.

10. An access control apparatus as claimed in claim 1, wherein the inner housing includes a printer interface.

11. An access control apparatus as claimed in claim 1, wherein the microphone is associated with the inner housing, the outer housing includes at least one microphone aperture and the microphone is aligned with the at least one microphone aperture when the inner housing is mounted within the interior of the outer housing.

12. An access control apparatus as claimed in claim 11, further comprising:

a substantially hollow conduit extending between the microphone and the microphone aperture.

13. An access control apparatus as claimed in claim 12, wherein the substantially hollow conduit includes a sloping interior surface.

14. An access control apparatus as claimed in claim 1, wherein the speaker is associated with the inner housing and the outer housing includes at least one speaker aperture.

15. An access control apparatus as claimed in claim 1, wherein the interior of the outer housing includes a shelf adapted to vertically support the inner housing.

16. An access control apparatus as claimed in claim 15, wherein the inner housing defines at least one mounting aperture and the shelf includes at least one mounting pin adapted to be inserted into the mounting aperture.

17. An access control apparatus as claimed in claim 1, wherein the exterior of the inner housing includes a plurality of inner keys operably connected to the communication device.

18. An access control apparatus as claimed in claim 17, wherein the inner keys comprise keys respectively corresponding to the letters A–Z and to the numbers 0–9.

19. An access control apparatus as claimed in claim 1, wherein the inner housing includes a battery.

20. An access control apparatus as claimed in claim 1, wherein the speaker comprises a first speaker associated with the inner housing and a second speaker associated with the outer housing.

21. An access control apparatus for use with a security system, comprising:

an outer housing including a door and defining an interior and an exterior, the exterior of the outer housing including a plurality of depressible outer keys arranged in predetermined locations and having respective portions extending into the interior of the outer housing; and a substantially closed inner housing defining an interior and an exterior, the interior of the inner housing including a communication device therewithin adapted to be operably connected to a telephone system and the exterior of the inner housing including a plurality of depressible inner keys, the inner housing being removably mounted within the interior of the outer housing such that the inner keys are substantially aligned with the outer keys when the inner housing is mounted within the interior of the outer housing.

22. An access control apparatus as claimed in claim 21, wherein the outer keys are movable between a rest position spaced apart from respective inner keys and a depressed position actuating respective inner keys.

23. An access control apparatus as claimed in claim 22, wherein the outer keys are biased to the rest position.

24. An access control apparatus as claimed in claim 22, wherein the inner keys comprise keys respectively corresponding to the numbers 0–9, the outer keys comprise keys respectively corresponding to the numbers 0–9, and like numbered inner and outer keys are aligned with one another when the inner housing is mounted within the interior of the outer housing.

25. An access control apparatus as claimed in claim 21, further comprising:

a blocking element adapted to prevent the outer keys from moving beyond a predetermined position within the interior of the outer housing.

26. An access control apparatus as claimed in claim 25, wherein the outer keys comprise longitudinally extending element which extends into the interior of the outer housing and a radially extending element which engages the blocking element when the longitudinally extending element reaches the predetermined position.

27. An access control apparatus as claimed in claim 21, wherein the inner keys comprise keys respectively corresponding to the numbers 0–9 and the letters A–Z and the inner housing further includes a visual display.

28. An access control apparatus as claimed in claim 21, wherein the inner housing includes a battery.

29. A method of servicing an access control apparatus, the access control apparatus comprising an outer housing including a door and defining an interior and an exterior having a plurality of outer keys, first and second substantially closed inner housings adapted to be removably mounted within the interior of the outer housing, the first and second inner housings respectively defining an interior and an exterior and at least one memory module port on the exterior and respectively including a non-volatile memory module adapted to be received in the port and an electronic communication device within the interior of the inner housing adapted to be operably connected to a telephone system and to the outer keys, the method comprising the steps of:

removing the first inner housing from the interior of the outer housing;

removing a memory module from the first inner housing without opening the first inner housing;

placing the memory module from the first inner housing into the second inner housing without opening the second inner housing; and placing the second inner housing into the outer housing.

* * * * *